Dec. 18, 1962 P. H. SHERRON 3,069,509

TELEPHONE DIALING MECHANISM

Filed Feb. 8, 1960

INVENTOR.

PERCIVAL H. SHERRON

BY Brown Smith & Harding

ATTORNEYS

1

3,069,509
TELEPHONE DIALING MECHANISM

Percival H. Sherron, Jamaica, N.Y. (% Sherron Metallic Corp., 1201 Flushing Ave., Brooklyn 37, N.Y.)
Filed Feb. 8, 1960, Ser. No. 7,199
1 Claim. (Cl. 179—81)

This invention relates to an improvement in a telephone dialing mechanism and more particularly relates to such a mechanism which is lighted for use at night in an improved manner.

The provision of lighting means for telephone dialing mechanism is useful for use in connection with telephones wherever located, but is of particular value for use in association with telephones located in telephone booths. While of utility under all circumstances, such lighting means has a special utility to facilitate the dialing of a telephone when the light in the area of the telephone fails. While provision for the emergency lighting of a telephone dial is useful for all installations, it is of particular utility when employed with a telephone in an isolated telephone booth such as an outdoor telephone booth where the failure of the general source of light within the booth may not be immediately detected and corrected.

In accordance with this invention, there is provided a dial mechanism lighted with an electro-luminescent lamp in such a manner as to provide for the ready reading of the indicia on the dialing mechanism so as to permit ready dialing. The employment of an electro-luminescent lamp is advantageous in that such a lamp has an extremely long life as contrasted to the lamp employed for general lighting within, for example a telephone booth, and is further advantageous in that if desired the electro-luminescent lamp can be operated by the voltage employed in the telephone. In accordance with this invention the electro-luminescent lamp is associated with the telephone dialing mechanism in such a manner as to permit clear reading of the indicia thereon with the illumination provided by the lamp.

The invention will be further clarified by reading of the following description in conjunction with the drawings in which.

Figure 1:
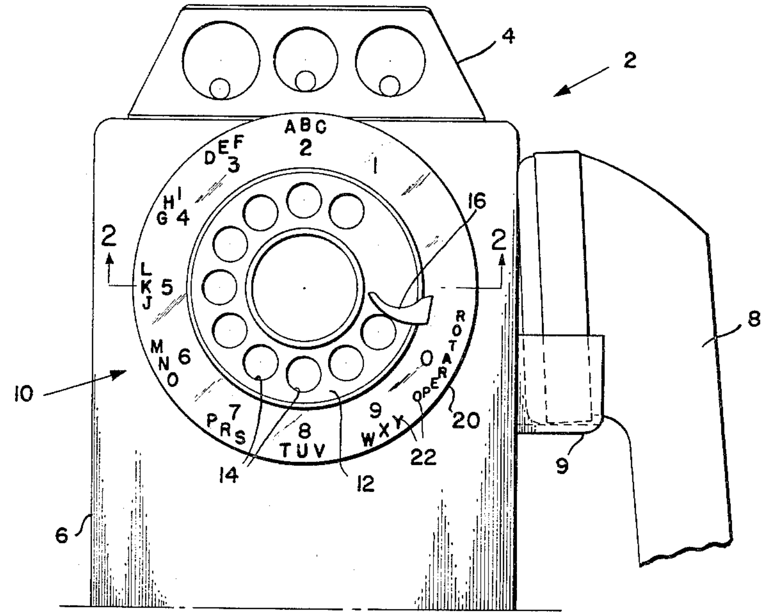
FIGURE 1 is an elevation partially broken away of a telephone for employment in a telephone booth.
Figure 2:
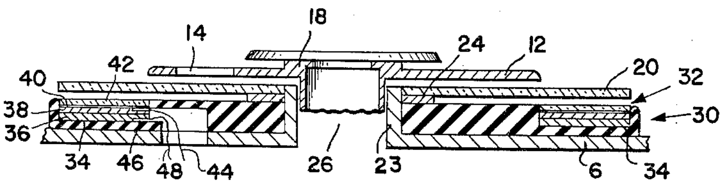
FIGURE 2 is a section taken on the plane indicated by the line 2—2 of FIGURE 1.
Figure 3:
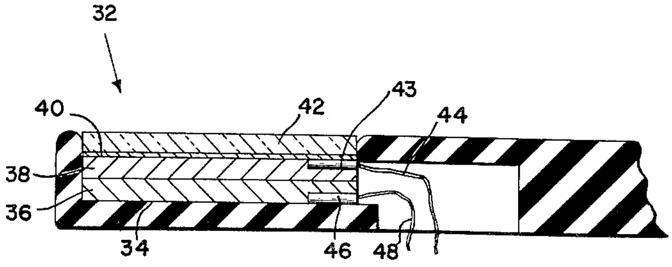
FIGURE 3 is an enlarged section of a portion of the structure shown in FIGURE 2.

As shown in FIGURE 1, a dial telephone 2 suitable for employment in a telephone booth has a conventional coin-receiving mechanism 4, a casing 6 containing the well-known conventional telephone mechanism and a receiver transmitter 8 resting in an operating cradle 9.

Referring again to FIGURE 1, a telephone 2 is provided with a dialing mechanism indicated generally at 10 having a rotatable dial 12 provided with a series of finger openings 14 about a periphery, a conventional finger stop mechanism indicated at 16 provided to limit the rotation of dial 12. Dial 12 is mounted for rotation on a rotatable spindle indicated at 18 which is connected to conventional telephone dialing mechanism.

As thus described the telephone 2 is well-known in the art and hence need not be detailed further here. The novel aspects of this invention are detailed hereinafter.

A fixed light transmitting dial 20 is provided with telephone dialing indicia 22 opposite the finger openings 14 as appropriate. Dial 20 will preferably be transparent but may, if desired, be translucent. Dial 20 will preferably be constructed of a plastic of which a very large number which are light transmitting are available such as, for example, cellulose acetate, styrene or an acrylic resin such as methyl methacrylate. Glass is also obviously

2 suitable. The indicia 22 will be in a medium which is in light contrast to dial 20. Advantageously they will be painted on the top or bottom surface of dial 20 employing an opaque material. For example, black enamel. However, they may be formed of a translucent or even a transparent material so long as there is a contrast between the indicia and dial 20. Thus for example, a translucent paint of a color differing from the color of dial 20 may be employed for the indicia. By way of further example, the indicia can be formed of the plastic employed to form the dial 20 but made with a color differing from the color of the dial 20. It will readily be apparent that any number of possibilities are involved here, the only requisite being that there be a contrast as between the light transmitted through the dial 20 and through the indicia, if any light is transmitted through the indicia.

The dial 20 surrounds hub 23 which extends from casing 6 and is secured thereto by a pressed fit. Adjacent dial 20 is a spacing ring 24 mounted on hub 23. Hub 23 surrounds opening 26 in casing 6 which accommodates spindle 18.

A lighting disc 30 is secured by a pressed fit to hub 23 and abuts casing 6. Disc 30 supports a circular electro-luminescent lamp indicated at 32 in a recess indicated at 34. Electro-luminescent lamp 32 has a conducting metal ring 36. Overlying ring 36 is a light-transmitting ring 38 containing embedded phosphor particles. The light-transmitting ring 38 can be formed of a translucent or transparent material, for example a plastic, ceramic or glass, which is an insulating dielectric material. The phosphor particles will be any material which will luminesce under the influence of an electric field. Typical examples are a fired mixture of zinc sulphide and oxide activated by halogen and copper and lead or a phosphor made by firing a powered mixture of 75% zinc sulphide and 25% zinc oxide by weight with small activating amounts of lead, copper and halide, the firing being done at between 900° C. and 1250° C. an an atmosphere of inert gas. Reference may be made to United States Patent 2,566,349 to Mager for typical phosphors.

Overlying ring 38 is a transparent conductive coating 40 coated on a glass ring 42. Coating 40 may be any transparent conductive coating known in the art. For example, coating 40 may be applied by exposing the heated glass 42 to vapours of silicon, tin or titanium chloride and afterwards placing the glas as thus coated in a slightly reducing atmosphere.

An electrode 43 comprising a metal tab is embedded in ring 38 so as to be in good contact with coating 40. Electrode 43 is connected to a lead 44. An electrode 46 in the form of a metal tab is embedded in metal ring 36 and connected to a wire lead 48. An alternating voltage is applied between coating 40 and metal plate 46 by means of electrodes 43 and 46 and wires 44 and 48, respectively, the wires being connected to an appropriate source such as the voltage employed in the operation of the telephone.

*Operation*

When wire leads 44 and 48 are connected to an appropriate source of alternating voltage, the interaction of the freed electrons and the phosphor particles results in the production of a luminescence which is directed towards light-transmitting dial 20 bearing the indicia 22. As the light passes through ring 20 providing a contrast between ring 20 and indicia 22, the indicia 22 are made readily legible in a manner so that the telephone can be readily dialed.

It is not desired to be limited except as set forth in the following claim.

What is claimed is:

In a dial telephone, a casing having a cylindrical portion extending therefrom, a disc having a front face and a rear face and made of insulating material stationarily fitted over said cylindrical portion, said casing supporting the entire rear face of said disc, a number plate made of light transmitting material stationarily fitted over said cylindrical portion, a spindle extending through said cylindrical portion, a finger wheel mounted upon said spindle overlying, and of a diameter substantially less than that of, said number plate, said number plate being provided with a circumferentially extending area underlying finger openings in said finger wheel, an electroluminescent lamp in the form of a flat annulus seated in a recess formed in the front face of said disc and disposed in axially spaced relation to said number plate, and dialing indicia on the outer marginal area of said number plate directly over said lamp, the inside diameter of said lamp corresponding substantially to the diameter of said finger wheel.

References Cited in the file of this patent

UNITED STATES PATENTS

| | | |
|---|---|---|
| 1,955,972 | Muse | Apr. 24, 1934 |
| 2,195,672 | Gerrels | Apr. 2, 1940 |
| 2,908,806 | Cohen | Oct. 13, 1959 |